United States Patent
Leichter

(10) Patent No.: US 7,233,344 B2
(45) Date of Patent: Jun. 19, 2007

(54) VIDEOPHONE HOUSING ASSEMBLY HAVING A FOLDABLE DISPLAY SUPPORT

(75) Inventor: Mark P. Leichter, Jamison, PA (US)

(73) Assignee: General Instrument Corporation, Horsham, PA (US)

(*) Notice: Subject to any disclaimer, the term of this patent is extended or adjusted under 35 U.S.C. 154(b) by 0 days.

(21) Appl. No.: 11/208,312

(22) Filed: Aug. 19, 2005

(65) Prior Publication Data

US 2007/0081076 A1  Apr. 12, 2007

(51) Int. Cl.
*H04N 7/14* (2006.01)
(52) U.S. Cl. ............................. 348/14.01; 348/14.02
(58) Field of Classification Search .. 348/14.01–14.16, 348/376; 361/681; 708/100; 455/575.3, 455/557, 556.1; 379/433.13
See application file for complete search history.

(56) References Cited

U.S. PATENT DOCUMENTS

| | | | | |
|---|---|---|---|---|
| 5,491,507 A | * | 2/1996 | Umezawa et al. | 348/14.02 |
| 5,966,164 A | * | 10/1999 | Gotoh et al. | 348/14.01 |
| 6,006,243 A | * | 12/1999 | Karidis | 708/100 |
| 6,667,759 B2 | * | 12/2003 | Gerszberg et al. | 348/14.01 |
| 6,873,521 B2 | * | 3/2005 | Landry et al. | 361/681 |
| 6,985,579 B2 | * | 1/2006 | Abood et al. | 379/433.13 |
| 2004/0062000 A1 | * | 4/2004 | Duarte | 361/683 |
| 2004/0114319 A1 | * | 6/2004 | Hill et al. | 361/683 |
| 2004/0160511 A1 | * | 8/2004 | Boesen | 348/14.02 |
| 2005/0005400 A1 | | 1/2005 | Park et al. | 16/367 |
| 2005/0219372 A1 | * | 10/2005 | Watanabe | 348/207.99 |
| 2005/0227747 A1 | * | 10/2005 | Song | 455/575.3 |
| 2005/0282596 A1 | * | 12/2005 | Park et al. | 455/575.3 |
| 2006/0079277 A1 | * | 4/2006 | Ditzik | 455/556.1 |

FOREIGN PATENT DOCUMENTS

JP  2000078549 A  *  3/2000
JP  2004179896 A  *  6/2004

* cited by examiner

*Primary Examiner*—Stella Woo
(74) *Attorney, Agent, or Firm*—Benjamin D. Driscoll

(57) ABSTRACT

A videophone housing assembly includes a base section and an interconnect, the interconnect having a first end rotationally coupled about a first axis to the base section, and a display support coupled to a second end of the interconnect. In an illustrative embodiment, a swivel hinge connects the display support to the interconnect in such a manner that the display support can rotate about two orthogonal axes.

14 Claims, 6 Drawing Sheets

VIDEOPHONE HOUSING ASSEMBLY HAVING A FOLDABLE DISPLAY SUPPORT

FIELD OF THE INVENTION

The present invention relates generally to a housing assembly for video telephony devices, and, more particularly, to a housing assembly for a video telephony device that includes a display support that is foldable so as to rest against the base in a fully closed position.

BACKGROUND OF THE INVENTION

FIG. 1 illustrates a video telephony device, and specifically, the Motorola Ojo™ Personal Videophone. As shown, the display monitor 50 is permanently connected, or "fixed" to a base unit 10 by a neck portion 65 (upon which a removable cordless handset 60 rests). The monitor 50, neck 65 and base 10 have a unitary fixed construction—and remain in the illustrated positions at all times.

Video telephony devices such as that illustrated in FIG. 1 are generally considered bulky and incapable of being easily shipped, moved and stored. Specifically, known video telephony designs include at least three problems—1) bulky packaging—the packaging for current designs is large and is difficult to ship large quantities in a single overpack or container; 2) bulky storage—the current packaging takes up too much retailer warehouse and shelf space; and 3) end user tabletop space is unusable when the phone is not in use—i.e., the Motorola Ojo™ Personal Videophone designs extend approximately 16 inches vertically from its base—therefore, the videophone monitor, when not in use, obstructs a user's view, and can be easily damaged (for example, by children or pets in a home environment). Of course, in both a home or office environment, many users cannot afford to dedicate a large portion of their desktop space to a videophone device that is not in constant use.

What is needed is a videophone device that provides all of the features of a typical videophone device, and provides significant new capabilities in the way of enhanced portability, space savings, and base component protection.

DETAILED DESCRIPTION

As detailed below, a housing assembly for a video telephony device is described having a display support that can fold toward a base so that in the folded position the display support essentially forms a cover for the base on which the display support is mounted. In this way the housing assembly provides a smaller, less obstructive, and easier-to-transport device than is provided by a typical video telephony housing assembly. By covering the base in this manner, the display support in some embodiments can also protect the user interface (e.g., pushbuttons, microphone and the like) that may be conveniently located in the base in a fixed or removable manner. While the device will be illustrated as a videophone having a foldable display that employs a simple hinge and axle construction, those of ordinary skill in the art will recognize that the invention more generally encompasses any housing assembly for a video telephony device having a foldable display support.

At the outset, it should be noted that the video telephony device that may be incorporated in a housing assembly such as those described herein may be any device that can transmit and receive voice and video information over any of a variety of different external communication media supporting any type of service, including voice over broadband (VoBB) and legacy services. VoBB is defined herein to include voice over cable modem (VoCM), voice over DSL (VoDSL), voice over Internet protocol (VoIP), fixed wireless access (FWA), fiber to the home (FTTH), and voice over ATM (VoATM). Legacy services include the integrated service digital network (ISDN) and plain old telephone service (POTS). Accordingly, the external communication medium may be a wireless network, a convention telephone network, a data network (e.g., the Internet), a cable modem system and the like.

Figure 2A:
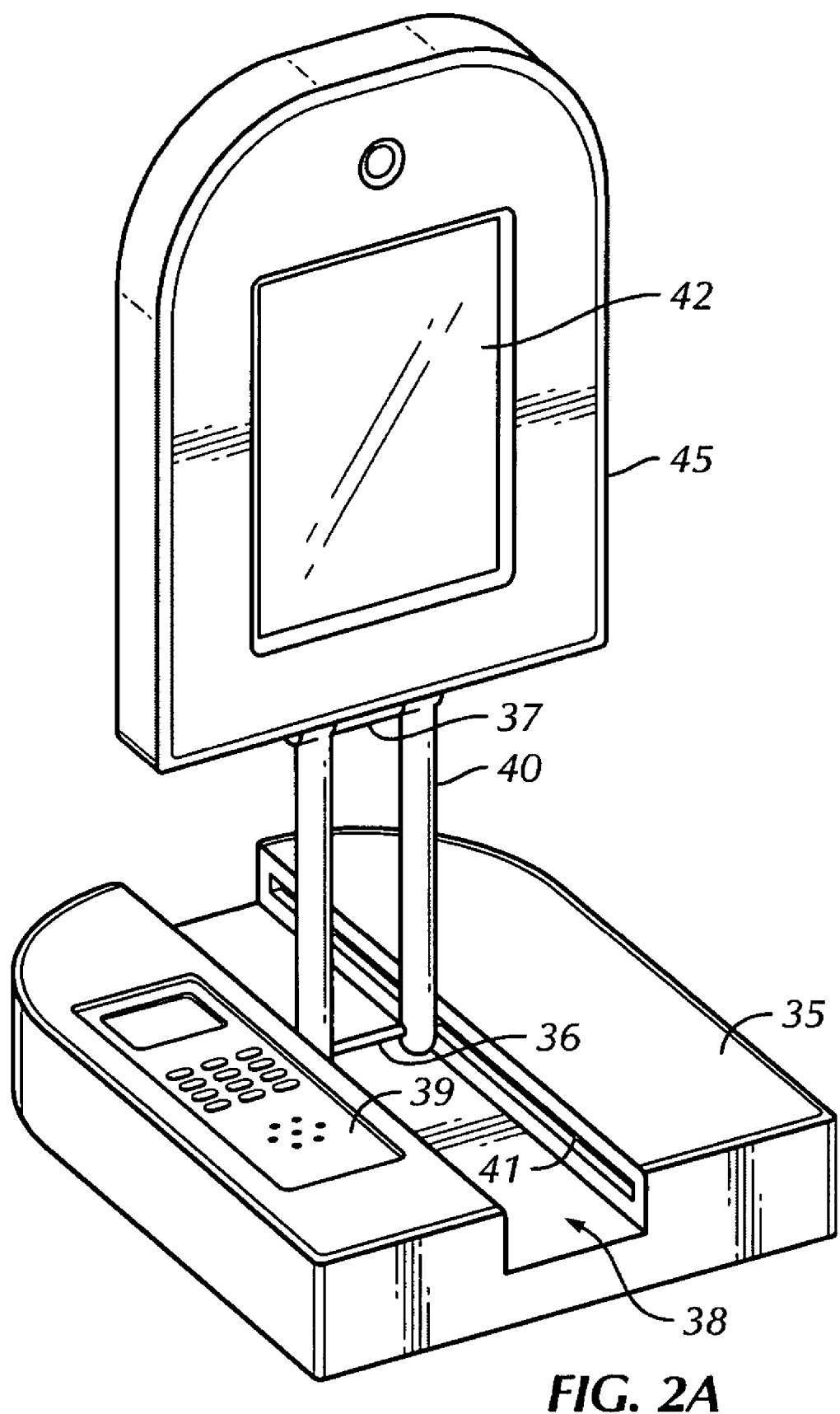
FIG. 2a is a perspective drawing of an embodiment of a video telephony device illustrating the display support in an open configuration.
Figure 2B:
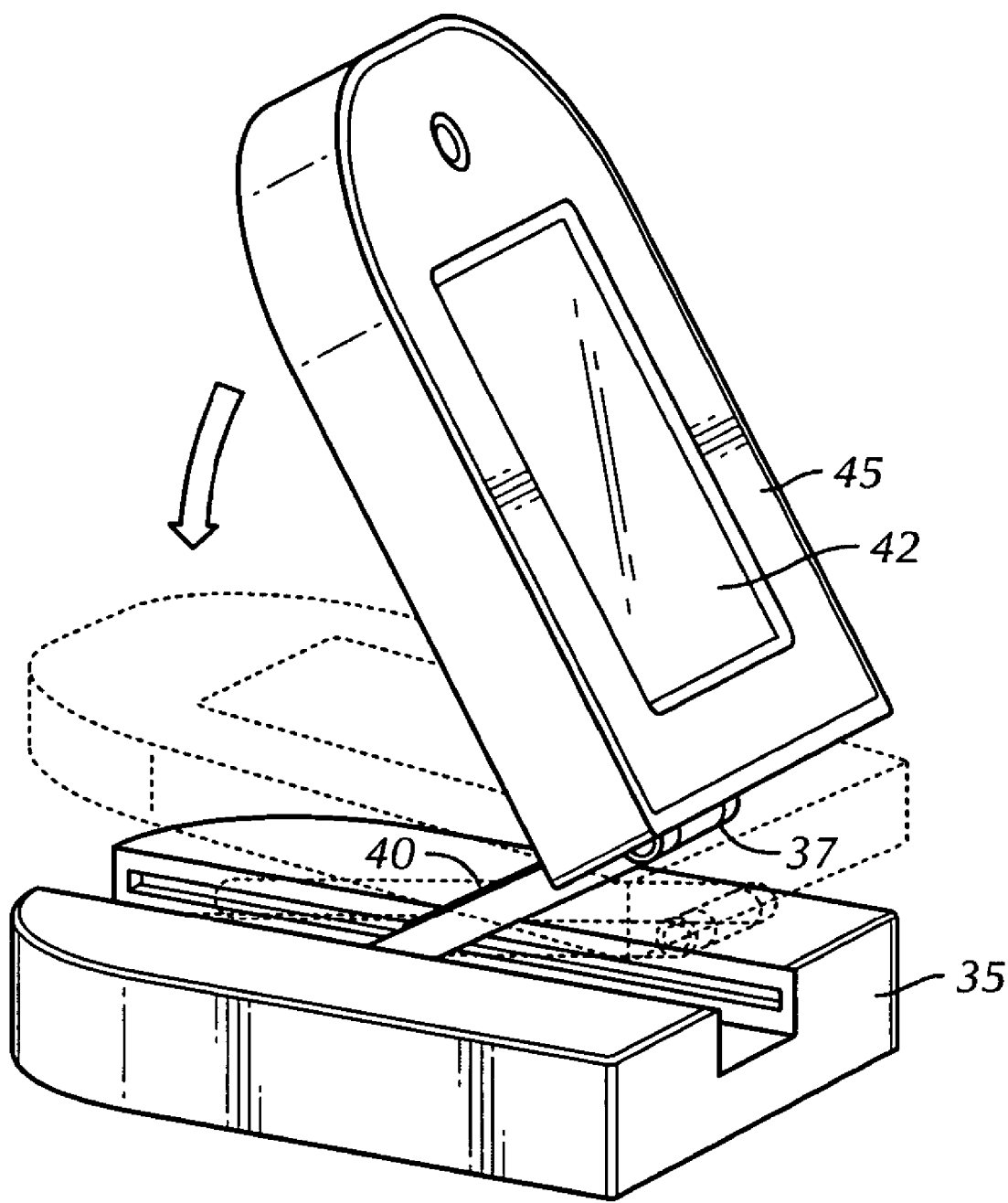
FIG. 2b is a side view of the display support of FIG. 2a in a partially closed position, and, in dotted lines, in a further partially closed position.

Referring to FIGS. 2a and 2b, there is shown a housing assembly for a video telephony device in accordance with one illustrative embodiment of the invention. As illustrated, the housing assembly includes three main components—a base 35, interconnect 40 and display support 45. A display screen 42 such as an LCD display is located in the display support 45. Interconnect 40 extends upwardly from the base 35 and holds the display screen 42 at an appropriate desired height. In some embodiments of the invention the length of interconnect 40 may be adjustable so that the height of the display screen above the base 35 can be adjusted by the user for convenience of use. In addition, interconnect 40 may include a telescoping feature, with multiple pieces that slide into one another or extend from one another, thereby allowing the height that the display screen extends above base 35 to be even further adjustable. In FIGS. 2a and 2b, display support 45 is shown in an open or operational position in which the display support 45 extends away from the base 35 via pivotable fasteners 36 and 37 so that the display screen 42 may be viewed by a user. In this way interconnect 40 mechanically couples display support 45 to base 35, while also serving as a housing for signal and power paths that electrically couple the display screen 42 to the various electrical components in base 35. In this illustrative design shown, pivotable fasteners 36 and 37 are separate components from interconnect 40—however, other designs are anticipated in which pivotable fasteners 36 and 37 are part of and integral with interconnect 40). It is also understood that a video telephony device includes many electronic components—and that all of such electronic components need not be housed in base 35, but rather may be housed in base 35, interconnect 40, display support 45, or any combination of these locations. A removable handset 39 may be received in base 35 and located so that it is accessible by a user when display support 45 is in the open position (and, in some embodiments, when it is in the folded position as well). Certain user interface elements such as the keypad may be located on the removable handset and/or fixed to the base 35 itself (i.e., the base may have a second keypad that can be used if the removable handset has been removed from the base). The speaker and microphone may also be located on the removable handset, base 35, interconnect 40 or display support 45.

Figure 2C:
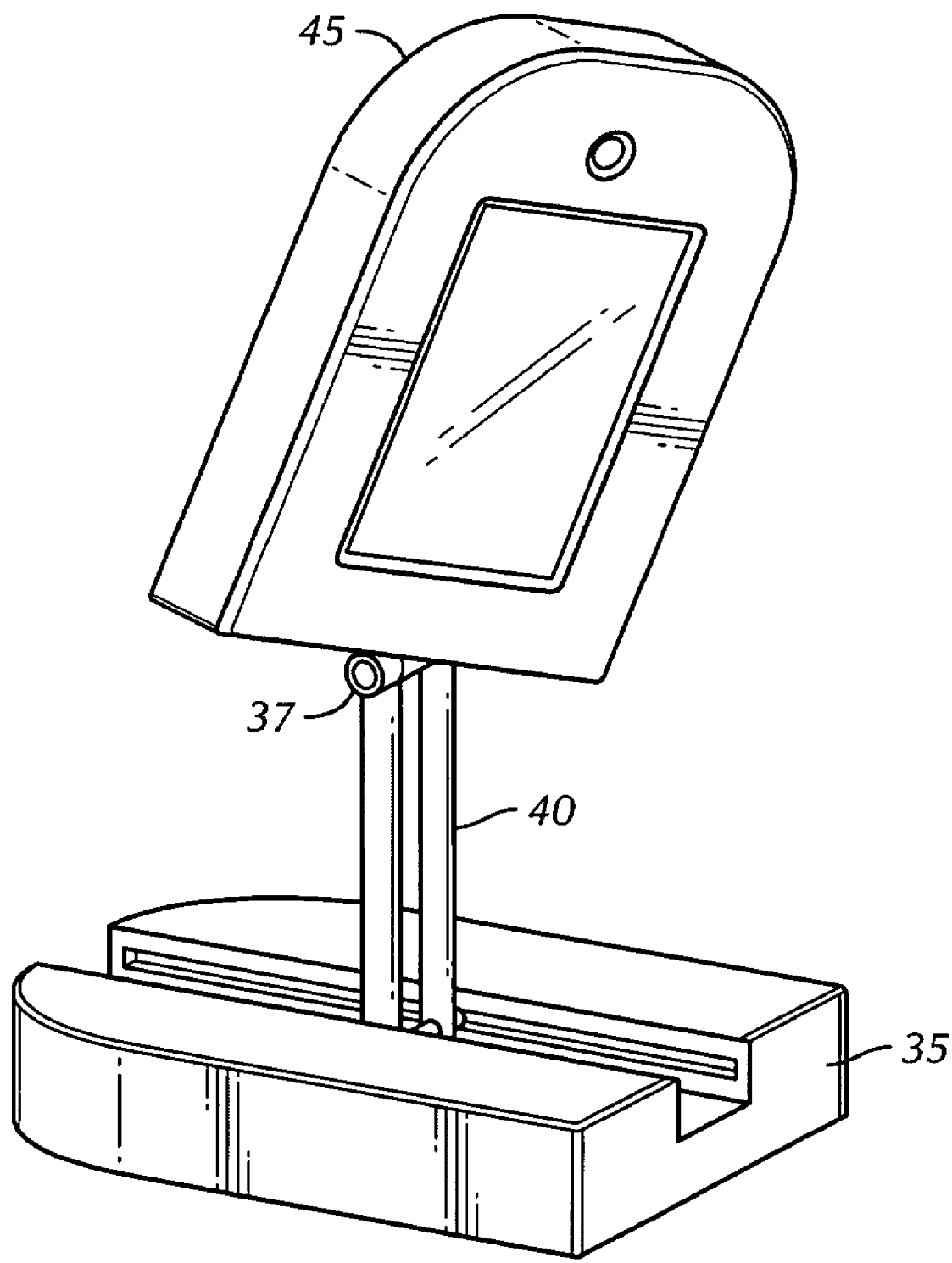
FIG. 2c is a perspective drawing of an embodiment of a housing assembly for a video telephony device illustrating the display support rotated to the left of its initial open configuration.

As shown in FIG. 2a, one or more pivotable fasteners 37 rotatably connect a top portion of interconnect 40 and a bottom portion of the display support 45. Suitable pivotable fasteners, such as hinges (i.e., any jointed or flexible device that allows the turning and/or pivoting of a part), for example, are known in the art and do not need to be discussed in detail. In general, the invention encompasses any appropriate hinge or any other pivotable fastener that allows display support 45 to be folded upon the base 35 when interconnect 40 is folded (discussed below). For instance, as shown in FIG. 2c, pivotable fastener 37 may be a swivel hinge, such as described in, for example, US Pub. No. 2005/0005400 A1, so that the display support 45 can rotate about two orthogonal axes (e.g., up-and-down and side-to-side) with respect to the interconnect 40 so that in addition to folding, the user can also adjust the side-to-side viewing angle at which the user observes the display screen 42 in the open position. Moreover, a swivel hinge of the type shown in the aforementioned reference also allows display support 45 to be folded toward base 35 in either a face-up direction (shown in FIG. 3) or a face-down direction. One advantage that arises from a face-up configuration is that the display screen 42 is visible even before the user opens the arrangement. In this way information appearing on the display screen such as the caller ID associated with an incoming call can be viewed before the user decides whether to answer the call. It should be noted that in some embodiments of invention, pivotable fastener 37 may be eliminated so that display support 45 and interconnect 40 are secured to one another in a fixed manner. This simplified arrangement may be particularly suitable when the pivotable fastener 36 can also be laterally displaced within a channel or recess, as discussed in more detail below.

Returning to FIG. 2a, the pivotable fastener 36 may include a pivotable hinge (a pin or shaft upon which another part, i.e., interconnect 40, turns) that is provided at an intersection portion between a bottom portion of interconnect 40 and base 35. Pivotable fastener 36 allows interconnect 40 to rotate or pivot about an axis, which in the illustrated embodiment is parallel to one of the axes about which pivotable fastener 37 rotates. A locking mechanism of any appropriate type may secure interconnect 40 about pivotable fastener 36 such that display support 45 is maintained in an open, closed, or intermediate position (those skilled in the art will appreciate that the terms 'open', and 'closed' are meant to be interpreted in the broadest manner, in that 'open' may define any position in which display support 45 is not resting upon base 35).

Figure 3:
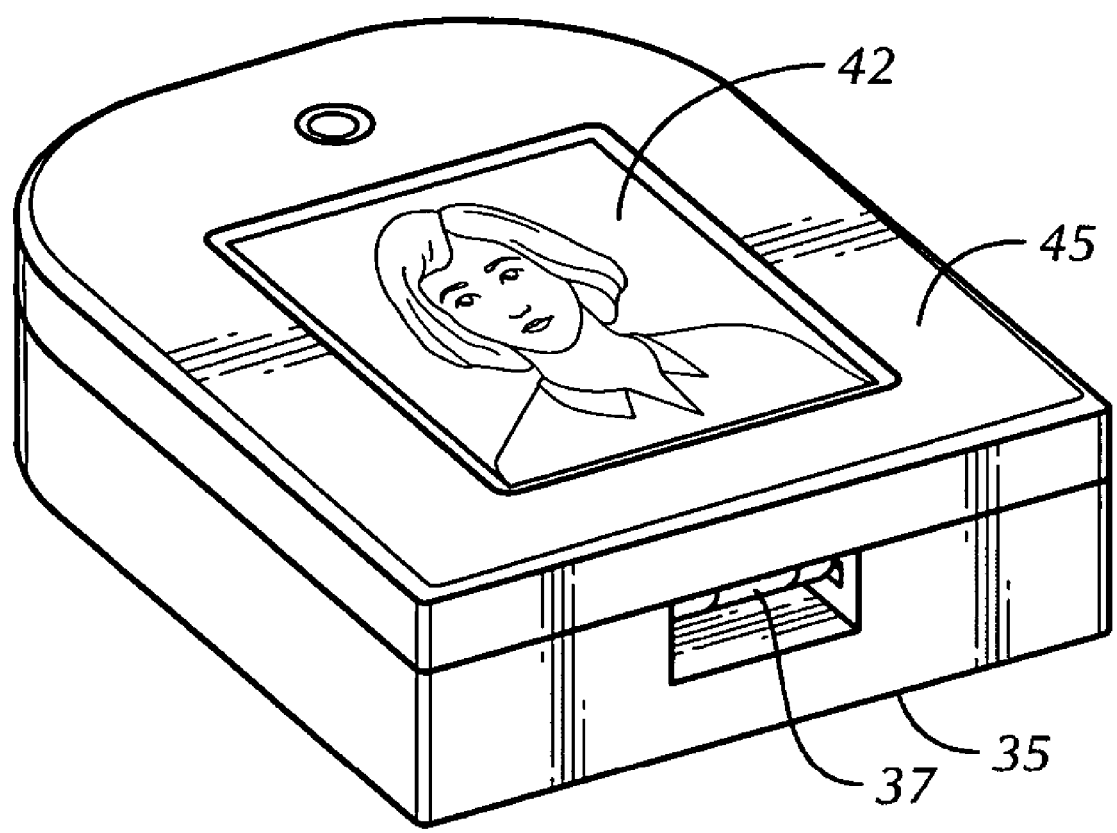
FIG. 3 is a perspective drawing of the embodiment shown in FIGS. 2a and 2b illustrating the display support in a closed configuration.

In the embodiment seen in FIG. 2(a), base 35 has an extended channel or recess 38 in which the pivotable fastener is located. An axle portion of pivotable fastener 36 may engage with guide rails 41 situated along the side walls of channel 38, (illustrated in FIG. 2a on only one inner side of the channel, but understood to be located on both sides of channel 38) so that the axle also serves as a slide pin that can slide back and forth within channel 38. As indicated in FIG. 2(b), pivotable fastener 36, in cooperation with guide rails 41, facilitates the opening and closing of display support 45 while also allowing the user to further adjust the position of display support 45 as desired. Moreover, if display support 45 and base 35 have similar footprints, by sliding pivotable fastener 36 in this manner, display support 45 may be folded onto base 35 so that they are aligned with one another, as seen in FIG. 3 (of course, while display support 45 and base 35 are illustrated in FIG. 2a as having similar footprints, those skilled in the art will appreciate that in other embodiments, the shape, size and/or designs of these components may differ). Pivotable fastener 36 may engage with guide rails 41 at a plurality of discrete points or at any point or location along the length thereof. The engagement mechanism may include, by way of example, manual release buttons or knobs, which can be manipulated to release a slide pin of pivotable fastener 36 from guide rails 41 to allow interconnect 40 to slide as necessary. Guide rails 41 may extend the entire length of channel 38 within base 35 (as shown), or, may extend only as far as is necessary to allow interconnect 40 to raise display support 45 to a desired height, and to allow the full length of interconnect 40 to fit into channel 38 upon being folded. Of course, pivotable fastener 36 and/or pivotable fastener 37 may also be in a fixed in position such that it cannot be displaced laterally but only rotate, in which case guide rails 41 are not required.

In FIG. 3, pivotable fastener 37 is illustrated as resting within a recess formed within base 35 and does not extend past an edge thereof. Those skilled in the art will appreciate that pivotable fastener 37 may also extend slightly beyond the edge wall formed by display support 45 resting upon base 35.

In a preferred embodiment, upon opening display support 45 so that it extends away from base 35, display support 45 automatically locks into position at a predetermined angle and orientation, both of which can be further manually adjusted by a user if desired.

As previously mentioned, in one illustrative embodiment, the footprint of display support 45 is substantially the same as the footprint of base 35 so that when folded they are aligned and coextensive with one another—thereby permitting the videophone display support 45 to fold from an estimated vertical height of approximately 16 inches, for example, down to a height of less than 4 inches. If, as mentioned above, the pivotable fastener 37 is eliminated, and if the overall footprint of the display support is significantly smaller than the overall footprint of base, the display support will rest over only a portion of base. For example, if display support 45 has, for example, a height of 6 inches, and is permanently fixed to interconnect 40 having, for example, a height of 6 inches, then the footprint of the display support 45 will only be located over a front portion of base 35, having a length of 12 inches—and pivotable fastener 36 will be positioned along guide rails 41 toward the backmost portion of channel 38.

In some particularly space-constrained locations, such as a small office cubicle or a system designed for use in the home, it is of course possible to mount the video telephony device to a wall, or under a kitchen cabinet for example, such that base 35 is mounted to allow display screen 42 to fold out for use, and valuable desk or counter space is thereby made available.

The foldable display screen 42 provides for a video telephony device of minimal physical size, saving desk space when not in use, and preventing damage if being transported, while also providing a display screen that can be oriented in any direction while in the open position and in a face-up or face-down position when in the closed position.

Figure 4:
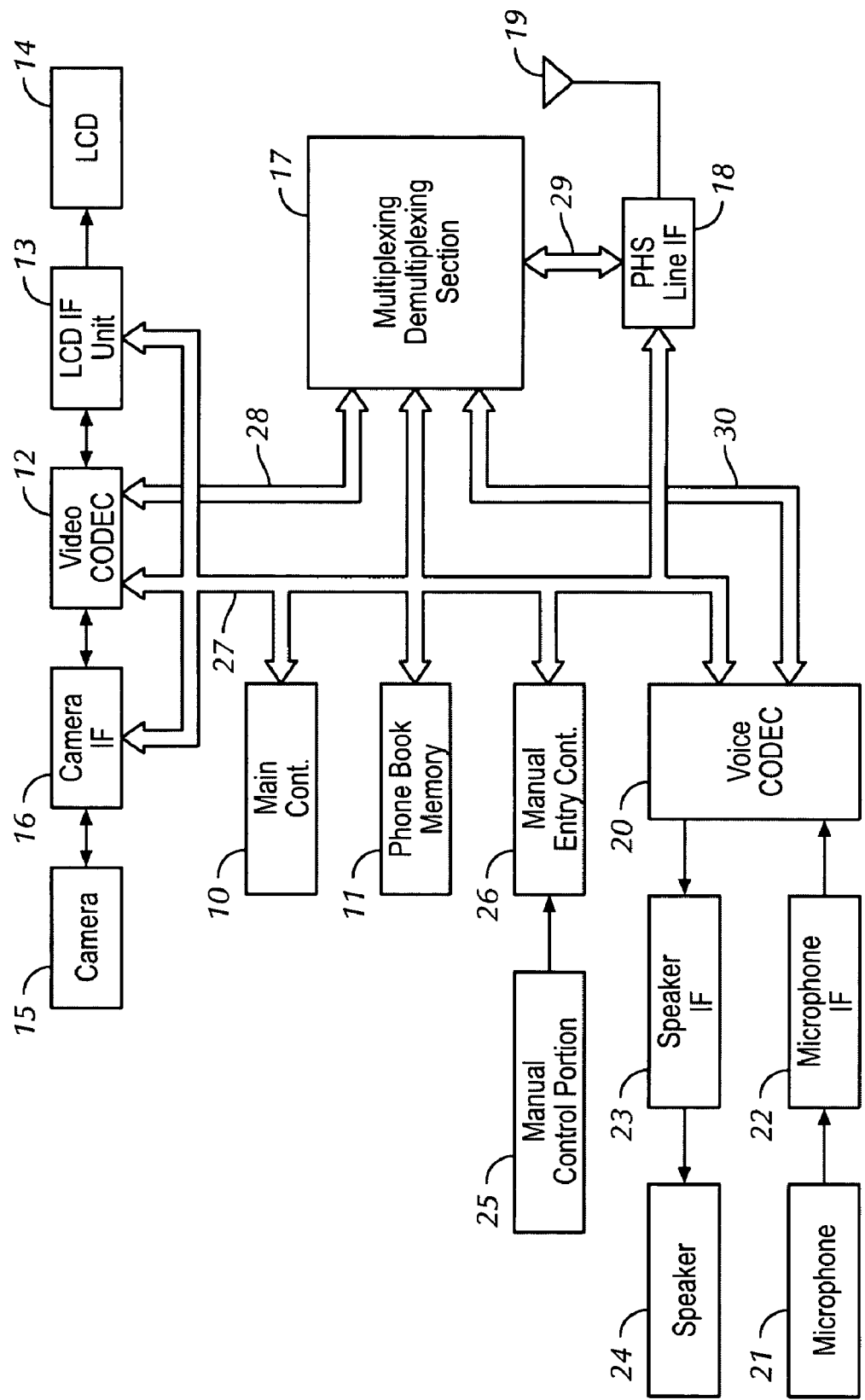
FIG. 4 shows a functional block diagram of a video telephony device.

FIG. 4 shows a functional block diagram of an exemplary video telephony device that may be located in the housing assembly of the present invention. Of course, this video telephony device is presented by way of illustration only and should not be construed as a limitation on the invention. The functional elements depicted in FIG. 4 are applicable across the various telephony platforms and protocols mentioned at the outset. That is, the video telephony device may be, without limitation, an analog phone, ISDN phone, analog cellular phone, digital cellular phone, PHS phone, Internet telephone and so on. Of course, the implementation of each functional element and the standards and protocols employed will differ from platform to platform. The device comprises a main controller 10, a phone book memory 11, a video codec 12, a display interface 13, a display unit 14 such as an LCD, a camera portion 15, a camera interface 16, a multiplexing and separating section 17, an external communications interface 18, a voice codec 20, a microphone 21, a microphone interface 22, a speaker interface 23, a speaker 24, a manual control portion 25, and a manual entry control circuit portion 26.

Of these components, the main controller 10, the phone book memory 11, the video codec 12, the LCD interface 13, the camera interface 16, the multiplexing and separating section 17, the communications interface 18, the voice codec 20, and the manual entry control circuit portion 26 are connected together via a main bus 27. The multiplexing and separating section 17 is connected with the video codec 12, the communications system interface 18, and the voice codec 20 via sync buses 28, 29, and 30, respectively.

The main controller 10 includes a CPU, a ROM, a RAM, and so on. The operations of the various portions of the video telephony device are under control of the main controller 10. The main controller 10 performs various functions in software according to data stored in the ROM, RAM and phone book memory 11.

Figure 1:
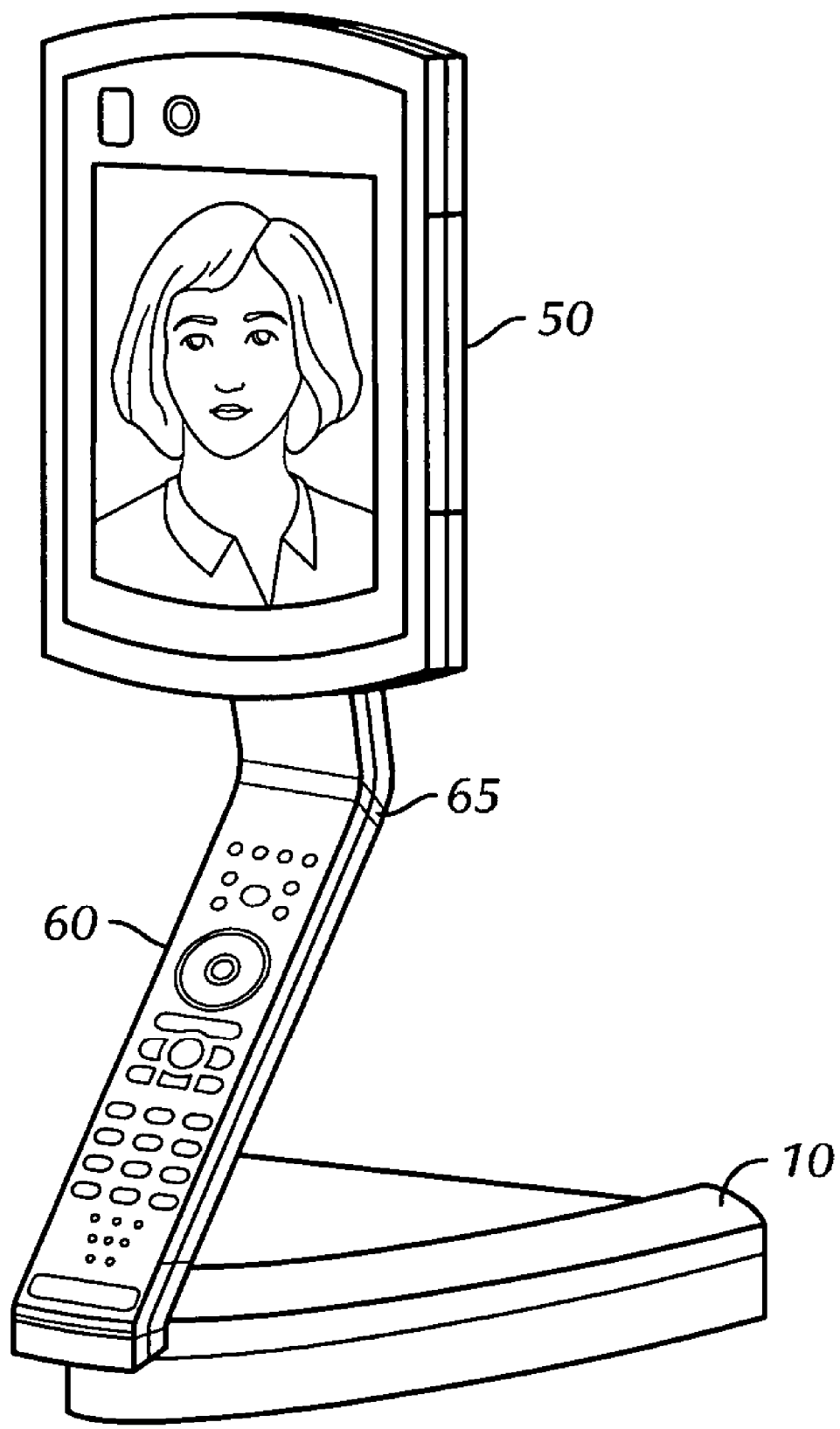
FIG. 1 depicts an exemplary illustration of a Motorola Ojo™ Personal Videophone video telephony device.

Although various embodiments are specifically illustrated and described herein, it will be appreciated that modifications and variations of the invention are covered by the above teachings and are within the purview of the appended claims without departing from the spirit and intended scope of the invention. For example, while the illustrative embodiment is depicted with the removable handset 39 located in the base 35, the handset 39 alternatively may be located on the interconnect 40, similar to the arrangement shown in FIG. 1. Furthermore, these examples should not be interpreted to limit the modifications and variations of the invention covered by the claims but are merely illustrative of possible variations.

The invention claimed is:

1. A housing assembly for a video telephony device, the housing assembly comprising:
   a base section having a channel substantially along a central line of the base section wherein the base section includes guide rails in the channel;
   an interconnect coupled to the base section by a first pivotable fastener rotationally coupled to a first end of the interconnect and to the base section so the interconnect is rotationally coupled about a first axis to said base section within the channel and further where the channel and first pivotable fastener permit lateral movement of the interconnect along the base section; and
   a display support coupled to a second end of said interconnect.

2. The housing assembly of claim 1, wherein said interconnect is configured to fold into the channel when said display support folds into a closed position.

3. The housing assembly of claim 1, wherein the guide rails cooperate with said first pivotable fastener such that said interconnect locks said display support in an open position.

4. The housing assembly of claim 1, wherein said interconnect is configured such that the display support may be folded to a closed position in both a face-up direction and a face-down direction.

5. The housing assembly of claim 1, wherein said base section is configured to receive a telephony user interface, said telephony user interface comprising a removable handset.

6. The housing assembly of claim 5, wherein said display support does not obstruct the removable handset when said display support is in a closed position resting upon said base section.

7. The housing assembly of claim 1, wherein said display support and said base section have substantially the same footprint.

8. The housing assembly of claim 7, wherein when said display support is folded to a closed position, said display support and said base section are aligned with one another.

9. The housing assembly of claim 1 further comprising a second pivotable fastener rotationally coupled to the second end of the interconnect and to the display support.

10. The housing assembly device of claim 9 wherein the first pivotable fastener rotates about a first axis and the second pivotable fastener rotates about a second axis substantially parallel to the first axis.

11. The housing assembly of claim 10 wherein the second pivotable fastener rotates about a third axis substantially orthogonal to the first axis and the second axes.

12. The housing assembly of claim 1 wherein the interconnect is adjustable so the display support is movable in height from the base section.

13. A video telephony device comprising:
   an audio and video telephony unit for transmitting and receiving audio and video information; and
   a housing assembly in which said audio and video telephony unit is located, said housing assembly including:
      a base section having a channel located substantially along a center line of the base section,
      an interconnect,
      a first pivotable fastener coupling a first end of said interconnect to said base section within the channel wherein the first pivotable fastener rotates about a first axis; and
      a display support coupled to a second end of said interconnect by a second pivotable fastener wherein the second pivotable fastener rotates about a second axis substantially parallel to the first axis and rotates about a third axis substantially orthogonal to the first axis; and
   a display screen located in the display support and operatively coupled to said audio and video telephony unit.

14. The video telephony device of claim 13 wherein the interconnect is adjustable so the display support is movable in height from the base section.

* * * * *